United States Patent
Jochman

(10) Patent No.: US 11,598,254 B2
(45) Date of Patent: Mar. 7, 2023

(54) SYSTEMS AND METHODS OF CONNECTING SERVICE PACKS INCLUDING AUXILIARY POWER SOURCES TO VEHICLE DATA AND VEHICLE SYSTEMS

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 45 days.

(21) Appl. No.: 16/860,846

(22) Filed: Apr. 28, 2020

(65) Prior Publication Data

US 2020/0340394 A1 Oct. 29, 2020

Related U.S. Application Data

(60) Provisional application No. 62/840,102, filed on Apr. 29, 2019.

(51) Int. Cl.
| | | |
|---|---|---|
| *F02B 63/04* | (2006.01) |
| *F02B 63/06* | (2006.01) |
| *G07C 5/02* | (2006.01) |
| *H02J 7/00* | (2006.01) |
| *G01S 19/42* | (2010.01) |
| *G01P 3/00* | (2006.01) |
| *H02J 7/14* | (2006.01) |
| *B60H 1/00* | (2006.01) |

(52) U.S. Cl.
CPC ....... *F02B 63/044* (2013.01); *B60H 1/00878* (2013.01); *F02B 63/06* (2013.01); *G01P 3/00* (2013.01); *G01S 19/42* (2013.01); *G07C 5/02* (2013.01); *H02J 7/00032* (2020.01); *H02J 7/14* (2013.01)

(58) Field of Classification Search
CPC .... B60H 1/00878; F02B 63/044; F02B 63/06; G01P 3/00; G01S 19/42; G07C 5/02; H02J 7/00032; H02J 7/0048; H02J 7/14; H02J 7/1415; H02J 7/1446
See application file for complete search history.

(56) References Cited

U.S. PATENT DOCUMENTS

| | | |
|---|---|---|
| 7,210,049 B2 | 4/2007 | Disser |
| 7,870,915 B2 | 1/2011 | Beeson |
| 7,908,911 B2 | 3/2011 | Renner |
| 8,261,717 B2 | 9/2012 | Peotter |
| 8,818,628 B2 | 8/2014 | Son |
| 8,833,066 B2 | 9/2014 | Renner |
| 8,862,337 B2 | 10/2014 | Peters |
| 8,893,841 B2 | 11/2014 | Peotter |
| 8,976,744 B2 | 3/2015 | Yousefi |
| 2009/0218173 A1 | 9/2009 | Beeson |

(Continued)

*Primary Examiner* — Lindsay M Low
*Assistant Examiner* — Ruben Picon-Feliciano
(74) *Attorney, Agent, or Firm* — McAndrews Held & Malloy, Ltd.

(57) ABSTRACT

Systems are disclosed for providing a work vehicle with a mounted auxiliary power source. The control system of the auxiliary power source may be connected to a communication network of the work vehicle to receive data from various systems of the work vehicle and control and power various systems of the work vehicle.

18 Claims, 4 Drawing Sheets

(56) References Cited

U.S. PATENT DOCUMENTS

| | | | |
|---|---|---|---|
| 2012/0029775 A1* | 2/2012 | Peters | B60W 30/1888 701/50 |
| 2014/0129748 A1 | 5/2014 | Muth | |
| 2015/0073684 A1 | 3/2015 | Renner | |

* cited by examiner

SYSTEMS AND METHODS OF CONNECTING SERVICE PACKS INCLUDING AUXILIARY POWER SOURCES TO VEHICLE DATA AND VEHICLE SYSTEMS

CROSS REFERENCE TO RELATED APPLICATIONS

The present application claims the benefit of U.S. Provisional Patent Application Ser. No. 62/840,102 filed Apr. 29, 2019, entitled "SYSTEMS AND METHODS OF CONNECTING SERVICE PACKS INCLUDING AUXILIARY POWER SOURCES TO VEHICLE DATA AND VEHICLE SYSTEMS." The entire contents of U.S. Provisional Patent Application Ser. No. 62/840,103 are expressly incorporated herein by reference.

FIELD OF THE DISCLOSURE

This disclosure relates generally to engine-driven power systems and, more particularly, to systems and methods of connecting service packs including auxiliary power sources to vehicle data and vehicle systems.

BACKGROUND

Typically, vehicles have communication networks on which systems of the vehicle transmit data in order to communicate with other vehicle systems. One or more control devices on the vehicle may use the communication networks to control the vehicle systems and/or collect data from the vehicle systems.

SUMMARY

Systems and methods of connecting service packs including auxiliary power sources to vehicle data and vehicle systems are disclosed, substantially as illustrated by and described in connection with at least one of the figures.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
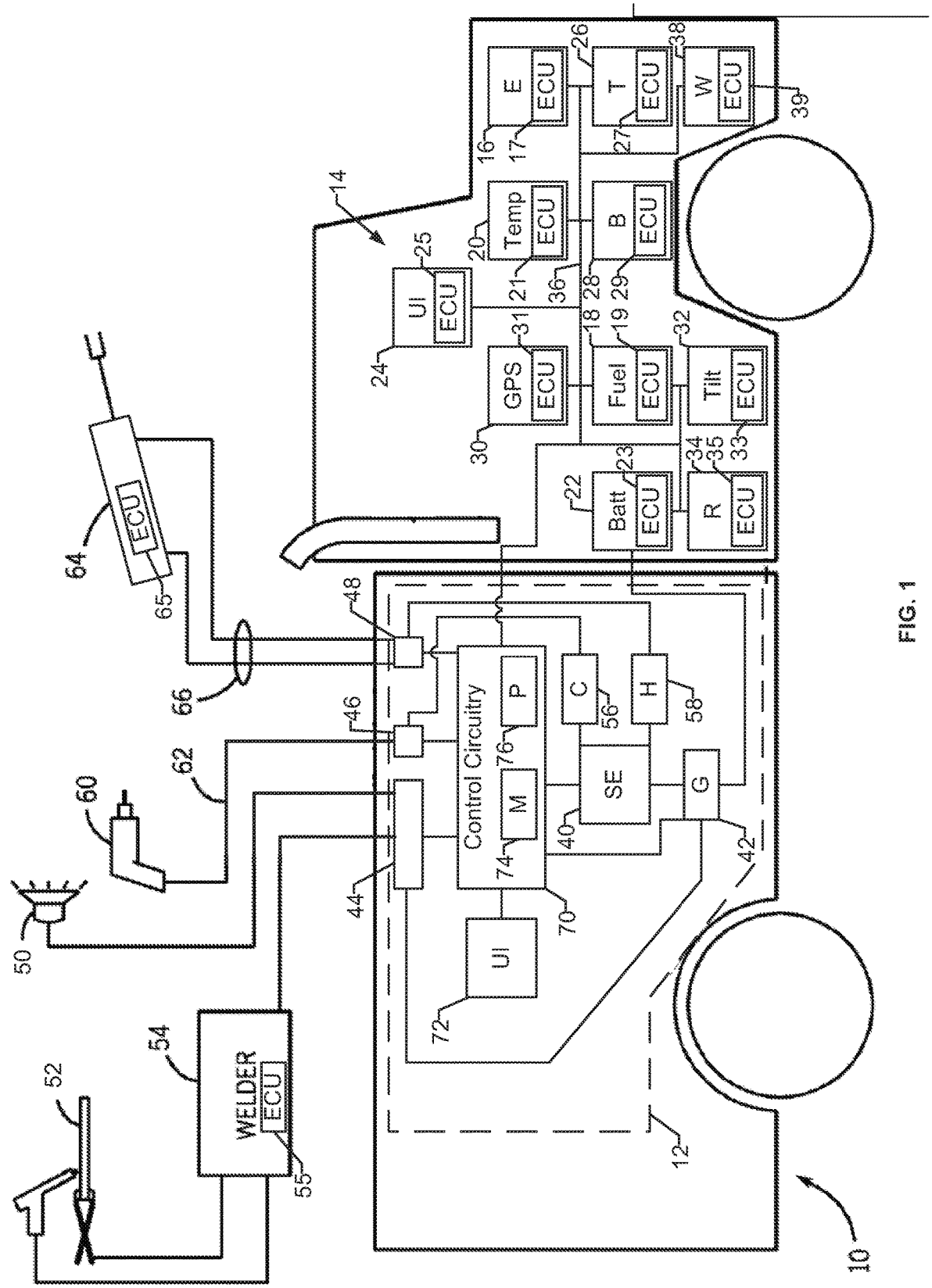
FIG. 1 diagrammatical overview of a work vehicle in which a service pack is installed in accordance with aspects of this disclosure.

A service pack is a vehicle mounted auxiliary power source. Service packs mounted on work vehicles may drive various loads, including welders, hydraulics, air compressors, and/or auxiliary loads such as tools or other devices connected to electrical, pneumatic, and/or hydraulic output(s) of the service pack.

Disclosed example service packs may also be integrated with one or more systems of a work vehicle on which the service pack is mounted. In some instances, the service pack may power one or more systems of the work vehicle. For example, a service pack may charge the work vehicle battery when the work vehicle engine is not running. It may be desirable to operate the service pack, or certain loads driven by the service pack, only when the work vehicle is not in motion, or when the engine of the work vehicle is not running. The present disclosure relates to systems and methods for communicating between components of a work vehicle and a control system of the service pack, for example via a communication system of the work vehicle. Control systems of disclosed example service packs may determine when the work vehicle is in an operational state for the service pack. An operational state for the service pack may include a state where the work vehicle is not in motion (i.e., is stationary) and/or when the work vehicle engine is not running. The present disclosure also relates to further integration of a work vehicle and a service pack.

A direct wired connection between the control system of the service pack and a parking brake of the work vehicle may be used by the service pack to determine when the work vehicle is in motion. This direct connection uses an interlock circuit. An interlock circuit may be limited in functionality, for example, to determining whether the parking brake is engaged or disengaged.

Typically, vehicles have a wired communication system whereby the various components of the vehicle may share operating information. For example, many vehicles use a communication bus such as a controller area network bus ("CAN Bus") to communicate. The CAN Bus is a message-based communications bus protocol. The data link layer of the CAN protocol is standardized as International Standards Organization ("ISO") 11898-1. The entireties of ISO 11898-1:2015, ISO 11898:2-2016, ISO 11898:3-2006, and ISO 11898-4:2004 are hereby incorporated by reference. Increasingly, many vehicles also use wireless networks to communicatively connect various components and systems of the vehicle.

Instead of using an interlock circuit, the control systems of disclosed example service packs may connect to and communicate with a communication network (i.e., the CAN Bus or a wireless network) of the work vehicle to which the service pack is mounted. Connecting the service pack to a communication network of the work vehicle allows the control system of the service pack to determine, from vehicle data transmitted on the communication network, whether the engine is running and/or whether the work vehicle is in motion, among other things. Connecting the service pack to the communication system of the work vehicle allows the control system of the service pack to receive data from and control various systems of the work vehicle, and allows the engine of the service pack to also drive various systems of the work vehicle.

Some vehicle components also communicate wirelessly. The control systems of disclosed service packs may wirelessly communicate directly with vehicle components.

Disclosed example service packs configured to be mounted on a work vehicle include: a housing configured to be mounted on the work vehicle; an engine within the housing and configured to power at least one of a generator, a hydraulic pump, or an air compressor; and control circuitry configured to: receive data from at least one component of the work vehicle; determine if the work vehicle is in a first state associated with at least one operation of the service pack based on the data received from the at least one component of the work vehicle; and control the at least one operation of the service pack based on the determination of whether the work vehicle is in the first state.

In some example service packs, the control circuitry receives data from the at least one component of the work vehicle via one of a wired connection to the at least one component or a wireless connection to the at least one component.

In some example service packs, the control circuitry receives data from the at least one component via a communication bus of the work vehicle.

In some example service packs, the communication bus is a controller area network bus.

In some example service packs, the control circuitry is configured to: receive, from the communication bus, data indicating a tilt of the work vehicle with respect to the horizontal; and send, via the communication bus, a control signal to outriggers of the work vehicle to correct the tilt.

In some example service packs, the control circuitry is configured to: receive, from the communication bus, data indicating a temperature of a cab of the work vehicle, and send, via the communication bus, a control signal to a temperature control system of the work vehicle to regulate the temperature of the cab.

In some example service packs, the engine is configured to charge a battery of the work vehicle, and wherein the control circuitry is configured to: receive, from the communication bus, data indicating a battery status; and control the engine to charge the battery based on the battery status data received from the communication bus.

In some example service packs, the at least one component is one of a braking system of the work vehicle, a transmission system of the work vehicle, a global positioning system of the work vehicle, or a wheel speed monitoring system of the work vehicle.

In some example service packs, wherein the first state corresponds to the work vehicle being stationary.

In some example service packs, the first state corresponds to a work vehicle engine not running.

In some example service packs, controlling the operation of the service pack includes allowing operation of at least one of the generator, the hydraulic pump, or the air compressor.

In some example service packs, the control circuitry is configured to control the service pack to provide power to at least one system of the work vehicle based on the determination of whether the work vehicle is in the first state.

In some example service packs, the control circuitry is configured to transmit a control signal to at least one component of the work vehicle.

Some example service packs further include a memory, and the control circuitry is configured to store in memory service pack usage data.

Disclosed example service packs configured to be mounted on a work vehicle include: a housing configured to be mounted on the work vehicle; a service engine within the housing and configured to power at least one of a generator, a hydraulic pump, or an air compressor; control circuitry configured to: receive data from at least one component of the work vehicle; determine if a work vehicle engine is running based on data received from the at least one component of the work vehicle; and control at least one operation of the service pack based on the determination of whether the work vehicle engine is running.

In some example service packs, the control circuitry is configured to enable operation of at least one of the service engine, the hydraulic pump, the generator, or the air compressor when the work vehicle engine is not running.

In some example service packs, the control circuitry is configured to control the service pack to provide power to at least one system of the work vehicle if the work vehicle engine is not running.

In some example service packs, the service engine is configured to charge a battery of the work vehicle, and the control circuitry is configured to: receive, from the communication bus, data indicating a battery status; and control the service engine to charge the battery based on the battery status when the work vehicle engine is not running.

Disclosed example work vehicles include: a work vehicle engine; a communication bus configured to communicate with a plurality of vehicle components including the work vehicle engine; and a service pack including: a housing configured to be mounted on the work vehicle; a service engine within the housing and configured to power at least one of a generator, a hydraulic pump, or an air compressor; and control circuitry configured to: receive data from the communication bus; determine if the work vehicle engine is running based on the data received from the communication bus; and control at least one operation of the service pack based on the determination of whether the work vehicle engine is running.

As used herein, power conversion circuitry refers to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit" and "control circuitry," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards, that form part or all of a controller, and are used to control a welding process, a device such as a power source or wire feeder, and/or any other type of welding-related system.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

As used herein, the term "torch," "welding torch," "welding tool" or "welding-type tool" refers to a device configured to be manipulated to perform a welding-related task, and can include a hand-held welding torch, robotic welding torch, gun, or other device used to create the welding arc.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

FIG. 1 is a diagrammatical overview of a work vehicle 10 in which a service pack 12 is installed. The work vehicle 10 is shown as a work truck, although any suitable configuration for the work vehicle may be envisaged. The work vehicle 10 has a cab 14 and an engine 16. The engine 16 may be a diesel engine or a gasoline engine. In other examples, the work vehicle 10 is an electrically-powered vehicle or a hybrid vehicle. The engine 16 consumes fuel from a fuel reservoir 18. The engine 16 may drive a temperature control system 20 (i.e., an air conditioning system and a heating system) to cool or heat the cab 14. The work vehicle 10 also has an electrical system including an alternator or generator along with a battery 22. The battery 22 may also provide power to various systems of the work vehicle 10, including lights and a user interface 24. The work vehicle 10 has a transmission system 26 and a brake system 28 including a parking brake. The work vehicle 10 also includes a GPS system 30. The work vehicle 10 may also include various other sensors, including temperature sensors (both internal and external), rain sensors, tilt sensors 32, wheel speed sensors 38 (e.g., sensors that monitor wheel speed in rotations per minute), fuel level sensors, tire pressure sensors, etc. The work vehicle 10 may also include many other systems, including power window systems, mirror adjustment systems, antilock braking system, cruise control system, airbag system, power steering system, and a vehicle leveling system that may include outriggers 34 to raise and/or lower a certain side of the work vehicle 10 to level (i.e., un-tilt) the work vehicle 10.

Each of the various systems of the work vehicle 10 may have an electronic control unit ("ECU") which may read sensor data of the associated system and/or control the output of the systems. As illustrated, the engine 16 has an engine ECU 17; the fuel reservoir 18 has a fuel reservoir ECU 19; the temperature control system 20 has a temperature control system ECU 21; the battery 22 has a battery ECU 23; the user interface 24 has a user interface ECU 25; the transmission 26 has a transmission ECU 27; the brake system 28 has a brake system ECU 29; the GPS 30 has a GPS ECU 31; the tilt sensor 32 has a tilt sensor ECU 33; the outriggers 34 have an outrigger ECU 35; and the wheel speed sensors 38 have a wheel speed sensor ECU 39.

Each ECU of the work vehicle 10 may also communicate with other ECUs of the work vehicle 10 via a communication network of the work vehicle 10. For example, vehicles typically include a CAN Bus 36 which connects the various ECUs of the work vehicle 10. The CAN Bus 36 of work vehicle 10 is illustrated as line 36 in FIG. 1. The ECUs may thus communicate with the other ECUs of the work vehicle 10 via the CAN Bus 36 via sending signals in the form of structured messages formatted according to the CAN protocol. A CAN Bus message includes an identifier to identify which ECU transmitted the message as well as data.

As an example, the user interface 24 may display fuel level data transmitted by the fuel reservoir ECU 19 on the CAN Bus 36 which the user interface ECU 25 received and processed. Location data may be transmitted by the GPS ECU 31 on the CAN Bus 36. The engine ECU 17 may transmit engine status, including whether the engine is running, total running time, running time since last turned on, engine temperature, and engine speed (e.g., in rotations per minute), on the CAN Bus 36. The transmission ECU 27 may transmit transmission information (i.e., reverse, park (if the vehicle has an automatic transmission), neutral, gear) on the CAN Bus 36. The brake system ECU 29 may transmit a signal indicating whether the parking brake is engaged on the CAN Bus 36. A battery ECU 23 may transmit a signal indicating the battery 22 status, including the battery charge level on the CAN Bus 36.

The CAN Bus 36 may also be used to send commands. For example, a user may select a desired cab 14 temperature at the user interface 24. The user interface ECU 25 then transmits a control signal to the ECU 21 of the temperature control system 20 via the CAN Bus 36. An internal cab 14 temperature sensor sends signals to the ECU 21 of the temperature control system 20. The ECU 21 of the temperature control system 20 controls the air conditioning system or heating system to cool or heat the cab based on the control signal transmitted from the user interface ECU 25 and feedback from the temperature sensor(s).

Although described as a CAN bus, in some examples some or all of the various systems of the vehicle may communicate wirelessly via any suitable wireless protocol including Bluetooth (IEEE 802.15.1), UltraWideBand (IEEE 802.15.3), ZigBee (IEEE 802.15.4), Wi-Fi (IEEE 802.11), WiMax (IEEE 802.16) or the like. In some examples, the various systems of the vehicle may also communicate via any suitable wired communication protocol including FlexRay (ISO 17458-1 to ISO 17458-5), Time-Triggered Protocol (Society of Automotive Engineers International ("SAE") AS6003), Ethernet and the like.

A service pack 12 is installed on the back of the work vehicle 10. The service pack 12 includes a service engine 40. The service engine 40 drives a generator 42. The service engine 40 is a source of mechanical power with the generator 42 utilizing that power to provide output, in the form of electrical power, in conventional systems. The mechanical power of the engine 40 is transferred to the generator 42 via a serpentine belt and/or via a direct or indirect linkage.

The generator 42 may provide power to various loads, which connect to the service pack 12 at receptacles/outputs 44 of the service pack 12. For example, a portable welder 54 (e.g., weld circuitry configured to convert power from the generator 42 to welding-type power) that provides current-controlled and/or voltage-controlled power suitable for a welding application receives power from the service pack 12. The welder 54 may receive power from the electrical output of the generator 42 via receptacles 44 and contains circuitry configured to provide for appropriate regulation of the output power provided to cables suitable for a welding application 52. The welder 54 may be any type of welding-type device, including a welder, plasma cutter, or induction heating device, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gases and other shielding supplies. Such wire feeders may be coupled to the service pack 12 and powered by the service pack 12, where desired. Additionally or alternatively, the service pack 12 may include integrated weld power conversion circuitry, which may receive power directly from the generator 42 and/or output welding-type power via welding terminals or studs on a housing of the service pack 12.

Auxiliary loads may also be coupled to the receptacles 44 and receive power from the service pack 12. Auxiliary loads may include lights 50, or any other loads that would otherwise be powered by operation of the work vehicle engine 16. The receptacle 44 may also be connected to the work vehicle battery 22 to provide battery charging and/or jump starting the work vehicle 10. The receptacle 44 may be connected to the battery 22 via a path that is internal to the body of the work vehicle 10 and/or via an external path (e.g., an extension cable connected to a jump start connector.) In some examples, the battery 22 is connected to the generator 42. The service engine 40 may also drive an air compressor 56 and/or a hydraulic pump 58. The air compressor 56 may provide compressed air via a hose 62 to a tool, such as an impact wrench 60. The hose may connect to an output 46 of the service pack 12. Similarly, a hydraulic load, illustrated in the form of a reciprocating hydraulic cylinder 64, may be coupled to the service pack 12 via appropriate hoses or conduits 66. The hoses or conduits 66 may connect to the service pack 12 at output 48. Some applications, such as hydraulic applications, may involve additional valves, particularly for directional control and/or load holding. Such valves may be incorporated into the work vehicle 10 and/or may be provided separately either in the application itself or intermediately between the service pack and the hydraulic actuators. One or more of the applications illustrated diagrammatically in FIG. 1 may be incorporated into the work vehicle 10 itself. For example, the work vehicle 10 may be designed to include a man lift, scissor lift, hydraulic tail gate, or any other driven systems which can be coupled to the service pack and driven separately from the main vehicle engine.

In some examples, the service engine 40 is configured to drive systems of the work vehicle 10. For example, the service engine 40 may provide power to the battery 22, the temperature control system 20, and/or outriggers 34 of the work vehicle 10.

The service pack 12 may be physically positioned at any suitable location in the work vehicle 10. In a presently contemplated embodiment, for example, the service engine 40 may be mounted on, beneath or beside the vehicle bed or work platform rear of the work vehicle cab 14. In some work vehicles, for example, the vehicle chassis may provide convenient mechanical support for the service engine 40 and certain of the other components of the service pack 12. For example, steel tubing, rails or other support structures extending between front and rear axles of the vehicle may serve as a support for the service engine 40.

Control circuitry 70 of the service pack 12 controls the various systems of the service pack 12, including the service engine 40, the generator 42, the compressor 56, and the hydraulic pump 58. The control circuitry 70 includes a memory 74 which may store machine readable instructions which may be executed by a processor 76. The control circuitry 70 may manage the power provided by the service engine 40 to the various loads via a priority scheme (e.g., the welder 54 may be the first priority, the compressor 56 second priority, the hydraulic pump 58 third priority, the auxiliary output 50 fourth priority, etc.) The control circuitry 70 may also receive data from sensors of the service pack 12, e.g., an engine speed sensor that senses the speed of the service engine 40 (e.g., in rotations per minute). Other sensors may include voltage and current sensors that monitor the voltage and current provided by the generator 42 and drawn by loads connected to the receptacles 44, the compressor 56, and/or the hydraulic pump 58. The service pack 12 may include a user interface 72 which a user may interact with to view information regarding the service pack 12 and/or adjust settings of the service pack 12.

It may be desirable to operate certain systems of the service pack 12 only when the work vehicle is in a particular state, for example when the engine 16 of the work vehicle 10 is off and/or when the work vehicle 10 is not in motion. For example, it may be undesirable to operate a hydraulic lift (or crane) 64 or a welder 54 while the work vehicle 10 is in motion. When the work vehicle engine 16 is running, there may be no need for the service engine 40 to power the temperature control system 20 or charge the battery 22 because the work vehicle engine 16 provides the power for those systems of the work vehicle 10.

The control circuitry 70 is connected to the CAN Bus 36 of the work vehicle 10 and therefore receives data transmitted by the various ECUs of the systems of the work vehicle 10 onto the CAN Bus 36. As described above, the engine ECU 17 may transmit signals via the CAN bus 36, such as messages indicating the engine 16 speed and/or when the engine 16 is running or off. The control circuitry 70 receives and processes the signals transmitted via the CAN bus 36 and determines whether the engine 16 is running or is off. Accordingly, the control circuitry 70 is programmed to communicate using the communication protocol of the work vehicle 10 (e.g., the CAN Bus protocol).

Additionally or alternatively, the GPS ECU 31 may transmit location data on the CAN Bus 36. The control circuitry 70 may receive, process, and compare successive signals sent by the GPS ECU 31 to determine whether the vehicle is in motion. If the work vehicle 10 has an automatic transmission 26, the transmission ECU 27 may transmit a signal on the CAN Bus 36 indicating when the work vehicle 10 is in park. The brake system ECU 29 may also transmit a signal on the CAN Bus 36 indicating when the parking brake is engaged. The control circuitry 70 may also receive and process these signals from the brake system ECU 29 and/or the transmission ECU 27 to determine whether the work vehicle 10 is in motion. Although described as connected to the CAN Bus 36, the control circuitry 70 may be connected to (i.e., configured to communicate with) any communication system (wired or wireless) of the work vehicle 10 which allows for communication between the various systems and components of the work vehicle 10. Accordingly, in some examples the control circuitry 70 may include a wireless communication interface to communicate with a wireless communication network of the work vehicle 10.

In some examples, the control circuitry 70 may communicate directly with one or more work vehicle components. For example the control circuitry 70 may receive date from and/or transmit date to one or more work vehicle systems or components, either via a wired or wireless connection.

In some examples, the control circuitry 70 may require signals from two or more work vehicle 10 systems to determine that the work vehicle 10 is in motion, or not in motion, as redundancy check. For example, the control circuitry 70 may require that the engine 16 is off and that the parking brake is engaged in order to operate one or more of the hydraulic pump 58, the compressor 56, the welder 54, the generator 42, or the service engine 50.

If the control circuitry 70 determines that the work vehicle 10 is not in a desirable state for operation of one or more systems of the service pack 12 (e.g., the work vehicle 10 is in motion, or the engine 16 is running), the control circuitry 70 may disable (i.e., send control signals to a given system to disable) one or more operations of the service pack 12. Likewise, if the control circuitry 70 determines that the work vehicle 10 is in a state that is associated with one or more operations of the service pack 12 (e.g., the work vehicle 10 is stationary, or the work engine 16 is not running), the control circuitry 70 may control an operation (e.g., allow operation of) one or more systems of the work vehicle. For example, the control circuitry 70 may control (e.g., enable and disable) one or more of the hydraulic pump 58, the compressor 56, the generator 42, the service engine 40, and/or power to one or more of the receptacles 44 (e.g., disable power to the welder and/or auxiliary receptacle 44) based on whether the work vehicle 10 is in motion and/or if the engine 16 is running. In addition, if the engine 16 is not running, then the control circuitry 70 may control the service engine 40 to provide power to various systems of the work vehicle 10, including the temperature control system 20, the battery 22, and/or outriggers 34. The control circuitry 70 may receive and process signals from the ECUs of systems of the work vehicle 10 (e.g., the temperature control system 20, the battery 22, and/or outriggers 34) that indicate that the systems require power. The control circuitry 70 may then control the service engine 40 to provide power to the given system.

Disabling of circuitry, actuators, components, and/or other hardware (e.g., the service engine 40, generator 42, the receptacles 44, the welder 54, the compressor 56, and/or the hydraulic pump 58) may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, components, and/or other hardware may be done via hardware, software (including firmware), or a combination of hardware and software, using the same mechanisms used for disabling.

The example control circuitry 70 tracks usage data of the work vehicle 10 and the service pack 12 and store the usage data in memory 74. For example, the control circuitry 70 may track how often the service pack 12 and its various systems are operating when the work vehicle 10 is parked (not in motion). The control circuitry 70 may also track how often the work vehicle engine 16 is running when the service engine 40 is running. This information could be used to determine a value of the service pack 12 and allow operators to ensure that the service pack 12 is being used efficiently. The usage data may be displayed to a user via the user interface 72 or transmitted to an external computing device (via a wired or wireless connection) and a user may then view and store the usage data at the external computing device.

In some examples, the control circuitry 70 controls one or more systems of the work vehicle 10. For example, the control circuitry 70 may receive a signal from the tilt sensor ECU 33 indicating that the work vehicle 10 is tilted (i.e., at an incline or slope with respect to the horizontal). In response, the example control circuitry 70 sends a signal to the outrigger 35 ECU to command the outriggers 34 of the work vehicle 10 to extend to level the work vehicle 10 (i.e., minimize or eliminate the incline or slope with respect to the horizontal). In some examples, the control circuitry 70 may also control the service engine 40 to provide power to the outriggers 34. In some examples, the control circuitry 70 may receive a signal from the battery ECU 23 and control the service engine 40 to provide power to the battery 22 to charge the battery 22 in response to the signal from the battery ECU 23.

In some examples, the user interface 72 of the service pack 12 enables a user to control one or more systems of the work vehicle 10. For example, a user may adjust the set cab 14 temperature at the user interface 72. In response, the control circuitry 70 sends control signals to the temperature control system ECU 21 via the CAN bus 36 to command the temperature control system 20 to bring the cab 14 to the temperature set at the user interface 72.

In some examples, one or more systems installed onto or connected to the work vehicle 10 may have ECUs with which the control circuitry 70 can communicate. For example, the welder 54 may have a welder ECU 55 and the hydraulic lift (or crane) 64 may have a hydraulic lift ECU 65. Information the control circuitry 70 receives from the welder ECU 55 and/or the hydraulic lift ECU 65 can be used along with work vehicle 10 data to control one or more operations of the service pack 12. Information received from the welder ECU 55 may include, for example, power demand data and/or usage data. Information received from the hydraulic lift ECU 65 may include, for example, power demand data, height data, and/or usage data. The control circuitry 70 may use this data to further control operation of the service pack 12.

Figure 2:
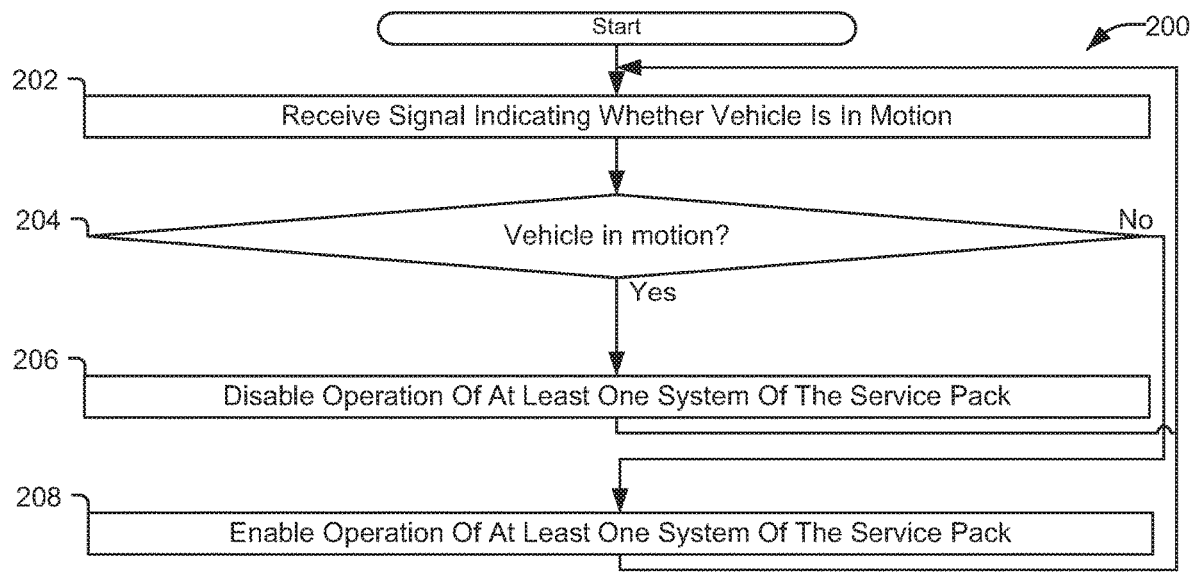
FIG. 2 is a flow chart representative of example machine readable instructions that may be executed by a service pack to control an operation of the service pack.

FIG. 2 is a flow chart representative of example machine readable instructions 200 that may be executed by a service pack to control an operation of the service pack. The machine readable instructions 200 may be partially or completely implemented by the control circuitry 70 of the service pack 12. The instructions 200 may be stored in memory 74 of the service pack 12 and executed by the control circuitry 70.

At block 202, the control circuitry 70 monitors the communication bus (e.g., the CAN Bus 36) of the work vehicle 10 for signal(s) from a system of work vehicle 10 indicating whether the work vehicle 10 is in motion. The signal(s) are transmitted onto the CAN Bus 36 from the ECU(s) of one or more of the systems of the work vehicle 10. The signal(s) are structured messages formatted according to the CAN Bus protocol (or other vehicle network protocol) which include identifier information and data.

At block 204, the control circuitry 70 determines, based on the signal(s) received in block 202, whether the work vehicle 10 is in motion. In some examples (e.g., if the work vehicle has an automatic transmission 26), the signal is transmitted from the transmission ECU 27 and indicates whether the work vehicle transmission 26 is in park, neutral, reverse, or gear. If the work vehicle transmission 26 is in park, then the control circuitry 70 determines at block 204 that the work vehicle 10 is not in motion. If the transmission 26 is in any other state, the control circuitry 70 determines that the work vehicle 10 is in motion. If the work vehicle 10 has a manual transmission 26, then the control circuitry 70 may use a signal from a different work vehicle system ECU or use a signal from the transmission ECU 27 in combination with a signal from another work vehicle system ECU. In some examples, the signal is transmitted from the GPS ECU 31 and indicates either a geographic location or a velocity of the work vehicle 10. If the indicated velocity is zero, then the control circuitry 70 determines that the work vehicle 10 is not in motion. If the GPS ECU 31 only transmits location data, then the control circuitry 70 may compare successive location signals received from the GPS ECU 31 to determine whether the work vehicle 10 location has changed. If the successive signals indicate that the work vehicle 10 location has not changed, then the work vehicle 10 is not in motion. Likewise, if the successive signals indicate that the location has changed, then the work vehicle 10 is in motion.

In some examples, the signal is transmitted from the wheel speed sensor ECU 39 and indicates the wheel speed. If the signal from the wheel speed sensor ECU 39 indicates that the wheel speed is any value other than zero, then the control circuitry 70 determines that the work vehicle 10 is in motion. In some examples, the brake system ECU 29 transmits a signal indicating whether the parking brake is engaged. If the signal from the brake system ECU 29 indicates that the parking brake is engaged, then the control circuitry 70 determines that the work vehicle 10 is not in motion. If the signal from the brake system ECU 29 indicates that the parking brake is not engaged, then the control circuitry 70 determines that the work vehicle 10 is in motion. In some examples, the engine ECU 17 transmits a signal indicating engine 16 speed, for example in rotations per minute. If the signal from the engine ECU 17 indicates that the engine 16 speed is below a threshold speed, then the control circuitry 70 determines that the work vehicle 10 is not in motion. If the engine 16 speed is above the threshold speed, then the control circuitry 70 determines that the work vehicle 10 is in motion. In some examples, the engine ECU 17 transmits a signal indicating whether the engine 16 is running (i.e., on or off). If the signal from the engine ECU 17 indicates that the engine 16 is not running, then the control circuitry 70 determines that the work vehicle 10 is not in motion. If signal from the engine ECU 17 indicates that the engine 16 is running, then the control circuitry 70 determines that the work vehicle 10 is in motion.

If the control circuitry 70 determines that the work vehicle 10 is in motion (block 204), then at block 206 the control circuitry 70 disables operation of at least one system of the service pack 12. As discussed above, it may be undesirable to operate one or more systems of the service pack 12 unless the work vehicle 10 is stationary. For example, the control circuitry 70 may disable one or more of the hydraulic pump 58, the compressor 56, the generator 42, the service engine 40, and/or power to one or more of the receptacles 44 (e.g., disable power to the welder and/or auxiliary receptacle 44). After disabling the at least one operation of the service pack 12 at block 206, the control circuitry 70 returns to block 202 and continues to monitor whether the work vehicle 10 is in motion.

If the work vehicle 10 is not in motion (block 204), then at block 208 the control circuitry 70 enables operation (or allows the continued operation of) of at least one system of the service pack 12. For example, the control circuitry 70 may allow operation of one or more of the hydraulic pump 58, the compressor 56, the generator 42, the service engine 40, and/or power to one or more of the receptacles 44 (e.g., enable power to the welder 54 and/or auxiliary receptacle 44). After enabling the at least one operation of the service pack 12 at block 208, the control circuitry 70 returns to block 202 and continues to monitor whether the work vehicle 10 is in motion.

Figure 3:
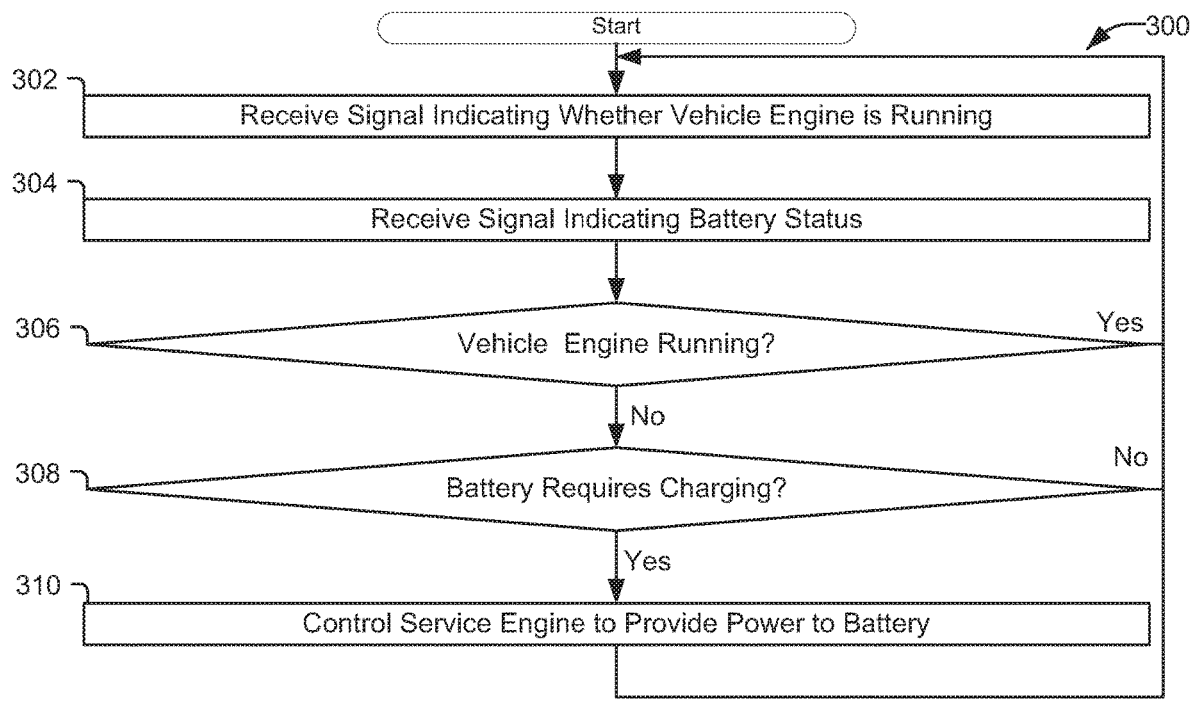
FIG. 3 is a flow chart representative of example machine readable instructions that may be executed by a service pack to charge a battery of a work vehicle.

FIG. 3 is a flow chart representative of example machine readable instructions 300 that may be executed by a service pack to charge the battery of a work vehicle. For example, the instructions 300 may be executed by the service pack 12 to charge the battery 22 of the work vehicle 10. The machine readable instructions 300 may be partially or completely implemented by the control circuitry 70 of the service pack 12. The instructions 300 may be stored in memory 74 of the service pack 12 and executed by the control circuitry 70.

At block 302, the control circuitry 70 monitors the communication bus (e.g., the CAN Bus 36) of the work vehicle 10 for signal(s) from the engine ECU 17 indicating whether the work vehicle engine 16 is running. The signal(s) is transmitted onto the CAN Bus 36 from the engine ECU 17.

At block 304, the control circuitry 70 monitors the communication bus (e.g., the CAN Bus 36) of the work vehicle 10 for signal(s) from the battery ECU 23 of work vehicle 10 indicating the battery 22 status. An example battery status may include a measured battery voltage and/or a flag indicating whether the battery voltage is less than a threshold voltage.

At block 306, the control circuitry 70 determines, based on the signal received at block 302, whether the work vehicle engine 16 is running. In some examples, the engine ECU 17 transmits a signal indicating engine 16 speed. If the signal indicates that the engine 16 speed is zero, then the control circuitry 70 determines that the engine 16 is not running. If the engine 16 speed is not zero, then the control circuitry 70 determines that the engine 16 is running. In some examples, the engine ECU 17 transmits a signal indicating whether the engine 16 is running (i.e., on or off). If the engine 16 is running (block 306), then the control circuitry 70 returns to block 302 and continues to monitor for signals indicating whether the engine 16 is running.

If the engine 16 is not running (block 306), then at block 308 the control circuitry 70 determines whether the battery 22 needs to be charged based on the battery status signal received in block 304. For example, the battery status signal received in block 304 may indicate a measured actual battery voltage. The control circuitry 70 may compare the actual battery voltage to a fully charged battery voltage value stored in memory 74 or a fully charged battery value that may be transmitted onto the CAN Bus 36 via the battery ECU 23. If the actual battery voltage is less than the fully charged battery voltage by a threshold amount, then the control circuitry 70 determines that the battery 22 requires charging.

If the battery 22 does not require charging (block 308), then the control circuitry 70 returns to block 302 and continues to monitor for signals indicating whether the engine 16 is running. If the battery 22 requires charging, then at block 310 the control circuitry 70 controls the service engine 40 to provide power to the battery 22 to charge the battery 22. The control circuitry 70 then returns to block 302 and continues to monitor for signals indicating whether the engine 16 is running.

Figure 4:
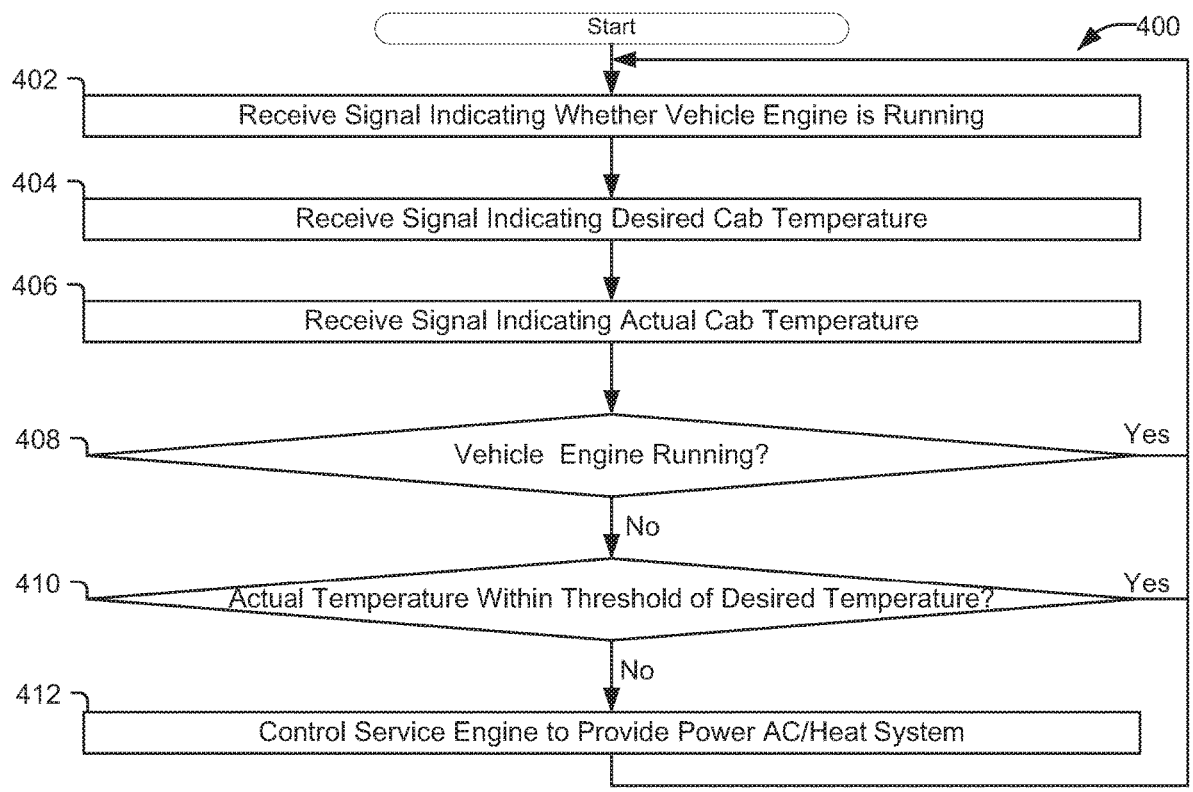
FIG. 4 is a flow chart representative of example machine readable instructions that may be executed by a service pack to control and power a temperature control system of a work vehicle.

FIG. 4 is a flow chart representative of example machine readable instructions 400 that may be executed by a service pack to control and power a temperature control system of a work vehicle. For example, the instructions 400 may be executed by the service pack 12 to control the temperature control system 20 of the work vehicle 10. The machine readable instructions 400 may be partially or completely implemented by the control circuitry 70 of the service pack 12. The instructions 400 may be stored in memory 74 of the service pack 12 and executed by the control circuitry 70.

At block 402, the control circuitry 70 monitors the communication bus (e.g., the CAN Bus 36) of the work vehicle 10 for signal(s) from the engine ECU 17 indicating whether the work vehicle engine 16 is running. The signal(s) is transmitted onto the CAN Bus 36 from the engine ECU 17.

At block 404, the control circuitry 70 receives a signal indicating the desired cab 14 temperature. In some examples, a user inputs a desired temperature into the user interface 24 of the work vehicle 10. A user interface ECU 25 transmits the desired temperature data via a signal on the CAN Bus 36 which is then received by the control circuitry 70. In some examples, a user may select a desired cab 14 temperature at the user interface 72 of the service pack 12 which is then received by the control circuitry 70.

At block 406, the control circuitry 70 monitors the CAN Bus 36 for signal(s) from the temperature control system ECU 21 indicating the actual temperature of the cab 14. In some examples, the control circuitry 70 may transmit a request for the actual cab temperature via the CAN bus 36 and monitor for a response from the temperature control system ECU 21.

At block 408, the control circuitry 70 determines, based on the signal from block 402, whether the work vehicle engine 16 is running. In some examples, the engine ECU 17 transmits a signal indicating engine 16 speed. If the signal indicates that the engine 16 speed is zero, then the control circuitry 70 determines that the engine 16 is not running. If the engine 16 speed is not zero, then the control circuitry 70 determines that the engine 16 is running. In some examples, the engine ECU 17 transmits a signal indicating whether the engine 16 is running (i.e., on or off). If the engine 16 is running (block 408), then the control circuitry 70 returns to block 402 and continues to monitor for signals indicating whether the engine 16 is running.

If the engine 16 is not running (block 408), then at block 410 the control circuitry 70 compares the desired cab temperature received at block 404 to the actual cab temperature received at block 406. If the actual cab temperature is within a threshold of the desired temperature (block 410), then the control circuitry 70 returns to block 402 and continues to monitor for signals indicating whether the engine 16 is running.

If the actual cab temperature is not within a threshold of the desired temperature (block 410), then at block 412 the control circuitry 70 controls the service engine 40 to provide power to the air conditioning or heating system of the temperature control system 20 to bring the actual cab temperature closer to the desired cab temperature. The control circuitry 70 then returns to block 402 and continues to monitor for signals indicating whether the engine 16 is running.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A service pack configured to be mounted on a work vehicle, the service pack comprising:
   a housing configured to be mounted on the work vehicle;
   an engine within the housing and configured to power at least one of a generator, a hydraulic pump, or an air compressor; and
   control circuitry configured to:
      receive data from at least one of a braking system of the work vehicle, a transmission system of the work vehicle, a global positioning system of the work vehicle, or a wheel speed monitoring system of the work vehicle;
      determine if the work vehicle is in a first state associated with at least one operation of the service pack based on the data received from the at least one component of the work vehicle, wherein the at least one of the braking system, the transmission system, the global positioning system, or the wheel speed monitoring system is separate from the service pack; and
      control the at least one operation of the service pack based on the determination of whether the work vehicle is in the first state.

2. The service pack of claim 1, wherein the control circuitry receives data from the at least one component of the work vehicle via one of a wired connection to the at least one component or a wireless connection to the at least one component.

3. The service pack of claim 1, wherein the control circuitry receives data from the at least one component via a communication bus of the work vehicle.

4. The service pack of claim 3, wherein the communication bus is a controller area network bus.

5. The service pack of claim 3, wherein the control circuitry is configured to:
   receive, from the communication bus, data indicating a tilt of the work vehicle with respect to the horizontal; and
   send, via the communication bus, a control signal to outriggers of the work vehicle to correct the tilt.

6. The service pack of claim 3, wherein the control circuitry is configured to:
   receive, from the communication bus, data indicating a temperature of a cab of the work vehicle, and send, via the communication bus, a control signal to a temperature control system of the work vehicle to regulate the temperature of the cab.

7. The service pack of claim 3, wherein the engine is configured to charge a battery of the work vehicle, and wherein the control circuitry is configured to:
receive, from the communication bus, data indicating a battery status; and
control the engine to charge the battery based on the battery status data received from the communication bus.

8. The service pack of claim 1, wherein the first state corresponds to the work vehicle being stationary.

9. The service pack of claim 1, wherein the first state corresponds to a work vehicle engine not running.

10. The service pack of claim 1, wherein controlling the operation of the service pack comprises allowing operation of at least one of the generator, the hydraulic pump, or the air compressor.

11. The service pack of claim 1, wherein the control circuitry is configured to control the service pack to provide power to at least one system of the work vehicle based on the determination of whether the work vehicle is in the first state.

12. The service pack of claim 1, wherein the control circuitry is configured to transmit a control signal to at least one component of the work vehicle.

13. The service pack of claim 1, further comprising a memory, and wherein the control circuitry is configured to store in memory service pack usage data.

14. A service pack configured to be mounted on a work vehicle, the service pack comprising:
a housing configured to be mounted on the work vehicle;
a service engine within the housing and configured to power at least one of a generator, a hydraulic pump, or an air compressor; and
control circuitry configured to:
receive data from at least one component of the work vehicle;
determine if a work vehicle engine is running based on data received from the at least one component of the work vehicle;
enable operation of at least one of the service engine, the hydraulic pump, the generator, or the air compressor based on a determination that the work vehicle engine is not running based on the data; and
control at least one operation of the service pack based on the determination of whether the work vehicle engine is running based on the data received from the at least one component of the work vehicle.

15. The service pack of claim 14, wherein the control circuitry is configured to control the service pack to provide power to at least one system of the work vehicle if the work vehicle engine is not running.

16. The service pack of claim 14, wherein the control circuitry receives data from the at least one component via a communication bus of the work vehicle.

17. The service pack of claim 16, wherein the service engine is configured to charge a battery of the work vehicle, and wherein the control circuitry is configured to:
receive, from the communication bus, data indicating a battery status; and
control the service engine to charge the battery based on the battery status when the work vehicle engine is not running.

18. A work vehicle comprising:
a work vehicle engine;
a communication bus configured to communicate with a plurality of vehicle components including the work vehicle engine; and
a service pack comprising:
a housing configured to be mounted on the work vehicle;
a service engine within the housing and configured to power at least one of a generator, a hydraulic pump, or an air compressor; and
control circuitry configured to:
receive data from the communication bus;
determine if the work vehicle engine is running based on the data received from the communication bus;
enable operation of at least one of the service engine, the hydraulic pump, the generator, or the air compressor based on a determination that the work vehicle engine is not running based on the data; and
control at least one operation of the service pack based on the determination of whether the work vehicle engine is running based on the data received from the at least one component of the work vehicle.

* * * * *